(12) United States Patent
Zhang et al.

(10) Patent No.: US 11,749,864 B2
(45) Date of Patent: Sep. 5, 2023

(54) FIXING STRUCTURE, BATTERY BOX, AND BATTERY PACK

(71) Applicants: Shenzhen Hairun New Energy Technology Co., Ltd., Guangdong (CN); Xiamen Hithium Energy Storage Technology Co., Ltd., Fujian (CN)

(72) Inventors: Wancai Zhang, Fujian (CN); Junmin Feng, Fujian (CN)

(73) Assignees: Shenzhen Hairun New Energy Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 17/918,781

(22) PCT Filed: Jul. 23, 2021

(86) PCT No.: PCT/CN2021/108225
§ 371 (c)(1),
(2) Date: Oct. 13, 2022

(87) PCT Pub. No.: WO2022/017513
PCT Pub. Date: Jan. 27, 2022

(65) Prior Publication Data
US 2023/0121037 A1    Apr. 20, 2023

(30) Foreign Application Priority Data
Jul. 24, 2020   (CN) .......................... 202010725247.5

(51) Int. Cl.
*H01M 50/262*   (2021.01)
*H01M 50/249*   (2021.01)

(52) U.S. Cl.
CPC ....... *H01M 50/262* (2021.01); *H01M 50/249* (2021.01); *H01M 2220/20* (2013.01)

(58) Field of Classification Search
CPC ............. H01M 50/262; H01M 50/249; H01M 2220/20; B60K 1/04; F16M 13/005; F16M 13/02
See application file for complete search history.

(56) References Cited

U.S. PATENT DOCUMENTS

| 8,835,033 B2* | 9/2014 | Choi ..................... B29C 65/002 206/703 |
| 9,034,506 B2* | 5/2015 | Michelitsch ........ H01M 10/625 429/120 |

(Continued)

FOREIGN PATENT DOCUMENTS

| CN | 105374965 A | 3/2016 |
| CN | 208760407 U | 4/2019 |

(Continued)

OTHER PUBLICATIONS

Machine English translation of DE 10 2015 112 088 (Year: 2017).*

(Continued)

*Primary Examiner* — Michael L Dignan
(74) *Attorney, Agent, or Firm* — IP Spring

(57) ABSTRACT

A fixing structure (300) for a battery pack is provided. The battery pack includes a box body (100). The fixing structure (300) is disposed on an outer surface of the box body (100) and includes a first connecting body (301), a second connecting body (302), and a transition body (303). The first connecting body (301) has one end connected with the box body (100). The second connecting body (302) has one end connected with the box body (100). The second connecting body (302) is spaced apart from the first connecting body (301). The transition body (303) has two ends connected with one end of the first connecting body (301) away from (Continued)

the box body (100) and one end of the second connecting body (302) away from the box body (100) respectively.

17 Claims, 5 Drawing Sheets

(56) References Cited

U.S. PATENT DOCUMENTS

| | | | | |
|---|---|---|---|---|
| 9,517,686 | B1* | 12/2016 | Paramasivam | H01M 50/244 |
| 2011/0045331 | A1* | 2/2011 | Wendorf | H01M 50/249 |
| | | | | 429/100 |
| 2012/0301765 | A1* | 11/2012 | Loo | H01M 50/224 |
| | | | | 429/100 |
| 2013/0115502 | A1 | 5/2013 | Zhou | |
| 2013/0192913 | A1* | 8/2013 | Joye | B60L 50/66 |
| | | | | 180/68.5 |
| 2018/0050607 | A1* | 2/2018 | Matecki | B60K 1/04 |

FOREIGN PATENT DOCUMENTS

| | | | | |
|---|---|---|---|---|
| CN | 111640900 A | | 9/2020 | |
| DE | 10 2015 112 088 | * | 1/2017 | B60K 1/04 |
| DE | 10 2017 106 648 | * | 10/2018 | B60K 1/04 |

OTHER PUBLICATIONS

Machine English translation of DE 10 2017 106 648 (Year: 2018).*
CNIPA, International Search Report for International Patent Application No. PCT/CN2021/108225, dated Sep. 27, 2021, 5 pages.
CNIPA, Written Opinion for International Patent Application No. PCT/CN2021/108225, dated Sep. 27, 2021, 7 pages.

* cited by examiner

FIXING STRUCTURE, BATTERY BOX, AND BATTERY PACK

CROSS-REFERENCE TO RELATED APPLICATION(S)

This application is a U.S. National Stage filing under 35 U.S.C. § 371 of International Patent Application No. PCT/CN2021/108225, filed Jul. 23, 2021, which in turn claims priority under PCT Article 8 and/or 35 U.S.C. § 119(a) to and the benefit of Chinese Patent Application Serial No. 202010725247.5, filed Jul. 24, 2020, the entire disclosure of which is hereby incorporated by reference.

TECHNICAL FIELD

The disclosure relates to the technical field of power batteries, and in particular, to a fixing structure, a battery box, and a battery pack.

BACKGROUND

Power batteries are power sources that provide power for various tools and devices. Generally, the power battery refers to a secondary battery that provides power for an electric vehicle, etc., which distinguishes it from a starter battery of an automobile engine.

Considering usage scenarios and an energy density of the power battery, the power battery usually exists in a form of a battery pack, and the battery pack has a box body for transferring and mounting. The battery pack usually includes multiple battery modules and is also provided with a battery management system, etc. The battery module includes multiple battery cells and can provide relatively higher voltage and battery capacity. Here, the battery cell is a basic unit that constitute the battery pack and battery module, and generally has a voltage ranging from 3 V to 4 V.

Since the battery pack includes multiple battery cells combined in series and parallel, it is necessary to consider a stability of mounting and transferring the power battery in the tool and the device, so as to avoid bumping or even damage due to battery shaking.

SUMMARY

In order to improve or solve a stability problem in mounting and transferring of power batteries, a fixing structure, a battery box, and a battery pack are provided in the disclosure.

A fixing structure for a battery pack is provided according to the disclosure. The battery pack includes a box body. The fixing structure is disposed on an outer surface of the box body and includes a first connecting body, a second connecting body, and a transition body. The first connecting body has one end connected with the box body. The second connecting body has one end connected with the box body. The second connecting body is spaced apart from the first connecting body. The transition body has two ends connected with one end of the first connecting body away from the box body and one end of the second connecting body away from the box body respectively.

The first connecting body, the transition body, and the second connecting body are connected in sequence to form a fixing structure in an integral form, which thus has a high stability and pulling-dragging resistance in its overall structure. In other words, the above fixing structure has a relatively high strength. Thus, after being provided with the fixing structure, the box body can be moved or fixed to an electrical device (such as an electric vehicle) through the fixing structure, so that the box body can withstand high-frequency and high-intensity movement operations, and at the same time, it is also beneficial to stably fixing a battery and keeping the battery relatively stationary with the electrical device, thereby reducing battery shaking.

In some implementations of the disclosure, the fixing structure is integrally formed.

In some implementations of the disclosure, the second connecting body defines multiple connecting holes, which facilitates transferring the box body.

In some implementations of the disclosure, at least one of the multiple connecting holes is a threaded hole; and/or at least one of the multiple connecting holes is an unthreaded hole. As such, the fixing structure can be limited from both a front side and a rear side, making mounting easy and more flexible.

In some implementations of the disclosure, the transition body defines a through hole.

In some implementations of the disclosure, part of the through hole faces the second connecting body in a direction from the first connecting body to the second connecting body.

In some implementations of the disclosure, the connecting hole includes an unthreaded hole, and the through hole faces the unthreaded hole.

In some implementations of the disclosure, the through hole has a first hole segment and a second hole segment connected in sequence, the first hole segment is located at one side of the second hole segment close to the first connecting body, and a width of the second hole segment is greater than a width of the first hole segment.

In some implementations of the disclosure, the transition body has a first connecting part, a bending part, and a second connecting part connected in sequence. One end of the first connecting part away from the bending part is connected with the one end of the first connecting body away from the box body. One end of the second connecting part away from the bending part is connected with the one end of the second connecting body away from the box body. The first connecting part and the second connecting part defines an angle therebetween. The first connecting part faces the second connecting body. The through hole extends from the first connecting part to the second connecting part.

In some implementations of the disclosure, the bending part is in an arc shape.

In some implementations of the disclosure, the second connecting body is perpendicular to the second connecting part.

In some implementations of the disclosure, the angle between the first connecting part and the second connecting part is an obtuse angle.

A battery box is provided according to the implementations of the disclosure. The battery box includes a box body having an internal cavity and the foregoing fixing structure. The fixing structure is fixed with the outer surface of the box body.

In some implementations of the disclosure, the box body and the fixing structure are integrally formed.

A battery pack is provided in the implementations of the disclosure. The battery pack includes the foregoing battery box.

In the above implementations, the fixing structure provided in the disclosure has appropriate structural strength, which makes the battery box with the fixing structure easy to be securely limited, and thus is beneficial to ensuring a stability of the battery stored in the battery box, avoiding a slow movement of the battery during transferring the battery box, and facilitating securely combining the battery with power-using devices/power supply devices.

BRIEF DESCRIPTION OF THE DRAWINGS

In order to describe technical solutions of implementations of the disclosure more clearly, the following will give a brief introduction to the accompanying drawings used for describing the implementations. It is appreciated that the accompanying drawings hereinafter described are merely some implementations of the disclosure and should not be deemed limitations on the scope. Based on these drawings, those of ordinary skill in the art can also obtain other drawings without creative effort.

Reference signs: 100—box body; 101—internal cavity; 102—outer surface; 200—battery box; 201—hanger; 202—bolted connector; 300—fixing structure; 301—first connecting body; 302—second connecting body; 303—transition body; 3031—connecting hole; 3032—thread; 3033—through hole; 401—first connecting part; 402—bending part; 403—second connecting part; 501—first hole segment; 502—second hole segment; 601—first part; 602—second part.

DETAILED DESCRIPTION

An electric vehicle typically uses a power battery as a power source, and generally adopts a battery pack formed by combining multiple battery cells. In order to secure the battery pack, the battery pack is received in a battery box, and then the battery box is mounted inside a vehicle body.

Since vehicles are often in high speed motion and also have quick start and stop, the battery box will be subjected to large momentary forces. Therefore, it is necessary for the battery box to be stable relative to the vehicle to ensure a stability of the battery pack. In addition, during mounting the battery pack, it may also need to move (such as hoist) the battery pack frequently, and thus it is also necessary to maintain smooth movement of the battery box.

Generally, a box body is a substantially flat rectangular structure with an internal space/internal cavity for storing battery cells. In order to hoist and fix the box body, at present, various appropriate structural members are welded on an outer surface of the box body, and then operations are applied to the box body through the structural members. However, these structural members have low structural strength and are easily damaged, especially after repeated transferring.

Figure 4:
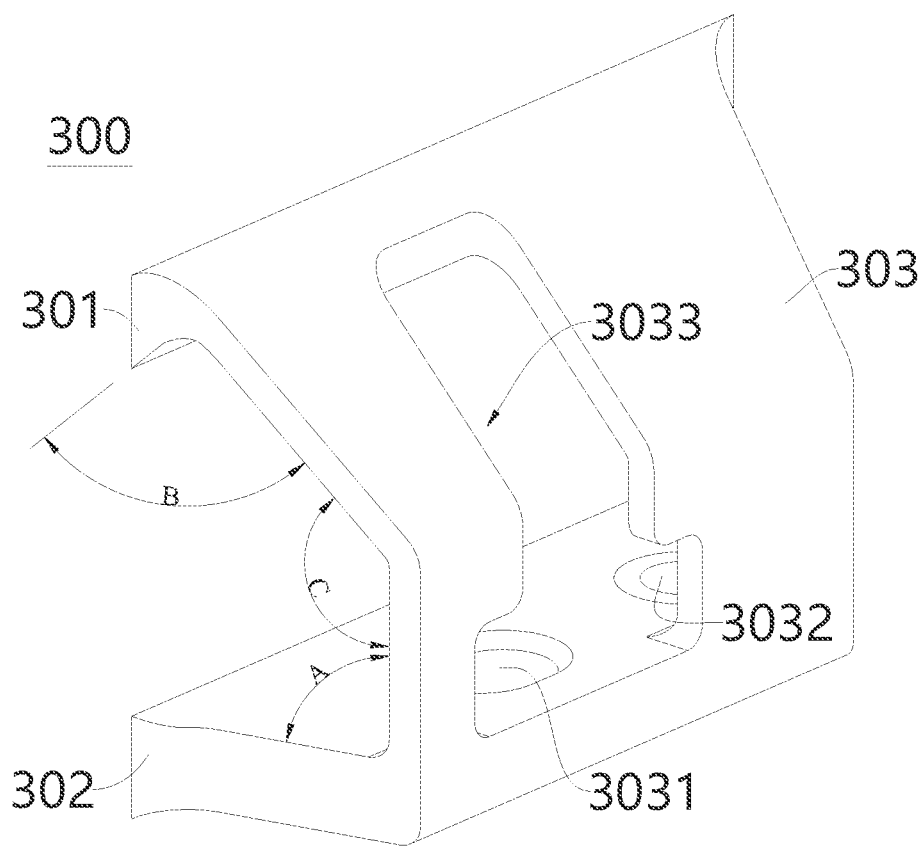
FIG. 4 is a schematic structural view of a fixing structure in implementations of the disclosure at a first view.
Figure 5:
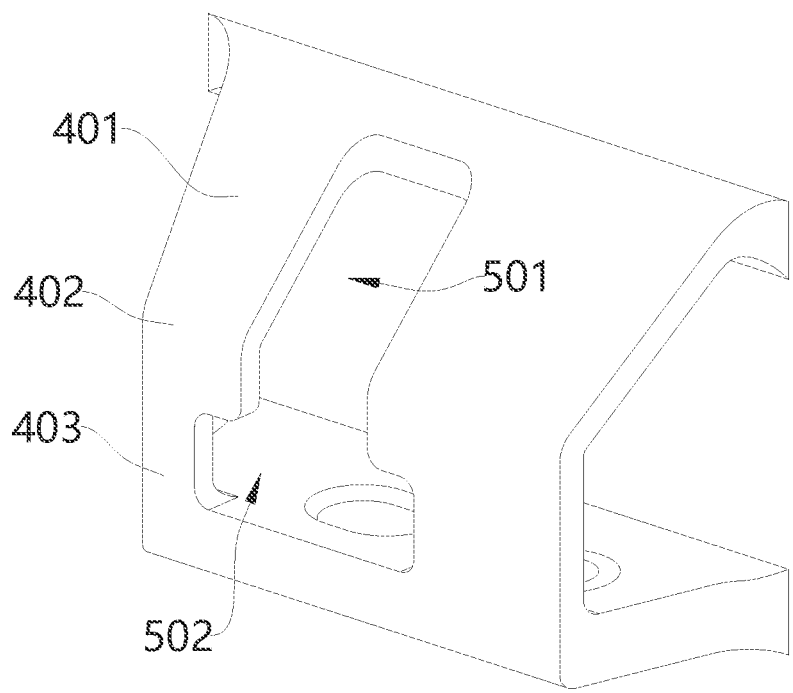
FIG. 5 is a schematic structural view of a fixing structure in implementations of the disclosure at a second view.
Figure 6:
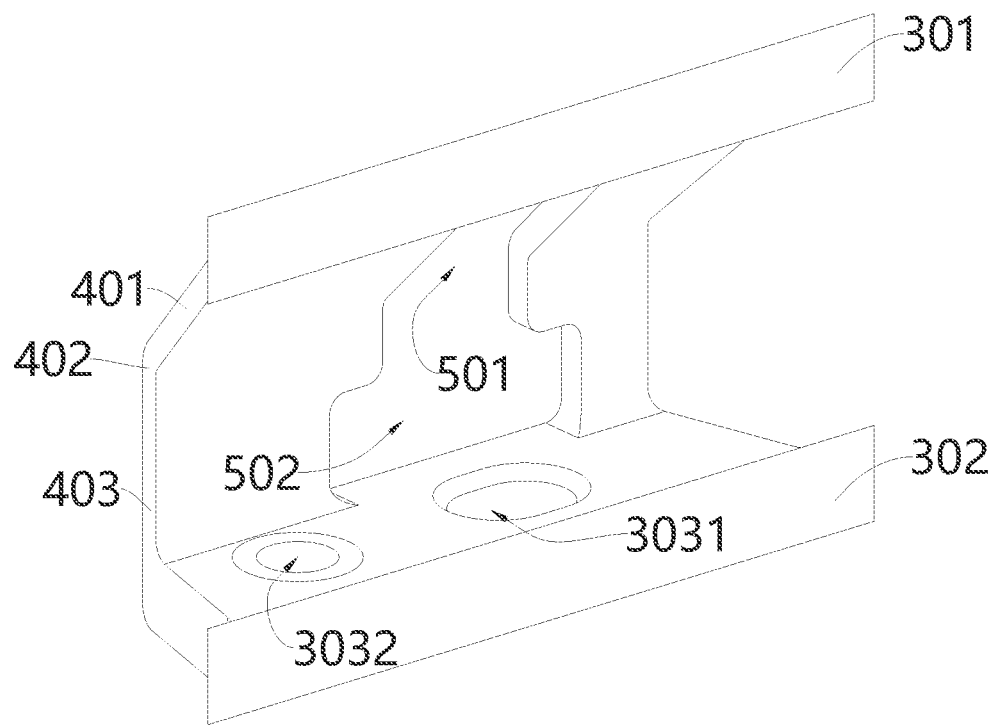
FIG. 6 is a schematic structural view of a fixing structure in implementations of the disclosure at a third view.

In view of above, referring to FIGS. 4 to 6, a fixing structure 300 is provided in implementations of the disclosure. Compared with existing two structural members, i.e., a structural member for fixing and a structural member for hoisting, the fixing structure 300 is an integral structure, and multiple combination points can be formed between the fixing structure 300 and the box body 100 and thus higher strength can be provided.

In addition, due to the aforementioned welding operation, the box body 100 is at risk of being burned through by high temperature of the welding operation, and heat generated by the welding will affect size and shape of the box body 100. The welding operation is also difficult and not easy to perform, resulting in a low yield and a long production cycle. In view of this, the fixing structure 300 provided with accordance to the implementations of the disclosure and the box body 100 are integrally formed (for example, extrusion molded) to be a one-piece member. As such, it is possible to avoid the box body from adverse effects and damages by canceling the welding operation to the box body 100.

It is noted that, since the welding operation may result in damage to the box body 100, in an example, the fixing structure 300 is integrally formed with the box body 100. However, it does not mean that the fixing structure 300 in the implementations of the disclosure can only be combined with the box body 100 by integrated forming. The fixing structure 300 may also be optionally welded with the box body 100 if adverse effects of the welding operation are not taken into consideration or if material selection and processing adjustment make the welding operation have no adverse effects or negligible adverse effects compared to advantages of the welding operation.

For ease of understanding the fixing structure 300 in an example of the disclosure, a structure of the box body 100 fitted with the fixing structure 300 in the example is briefly described below.

Figure 1:
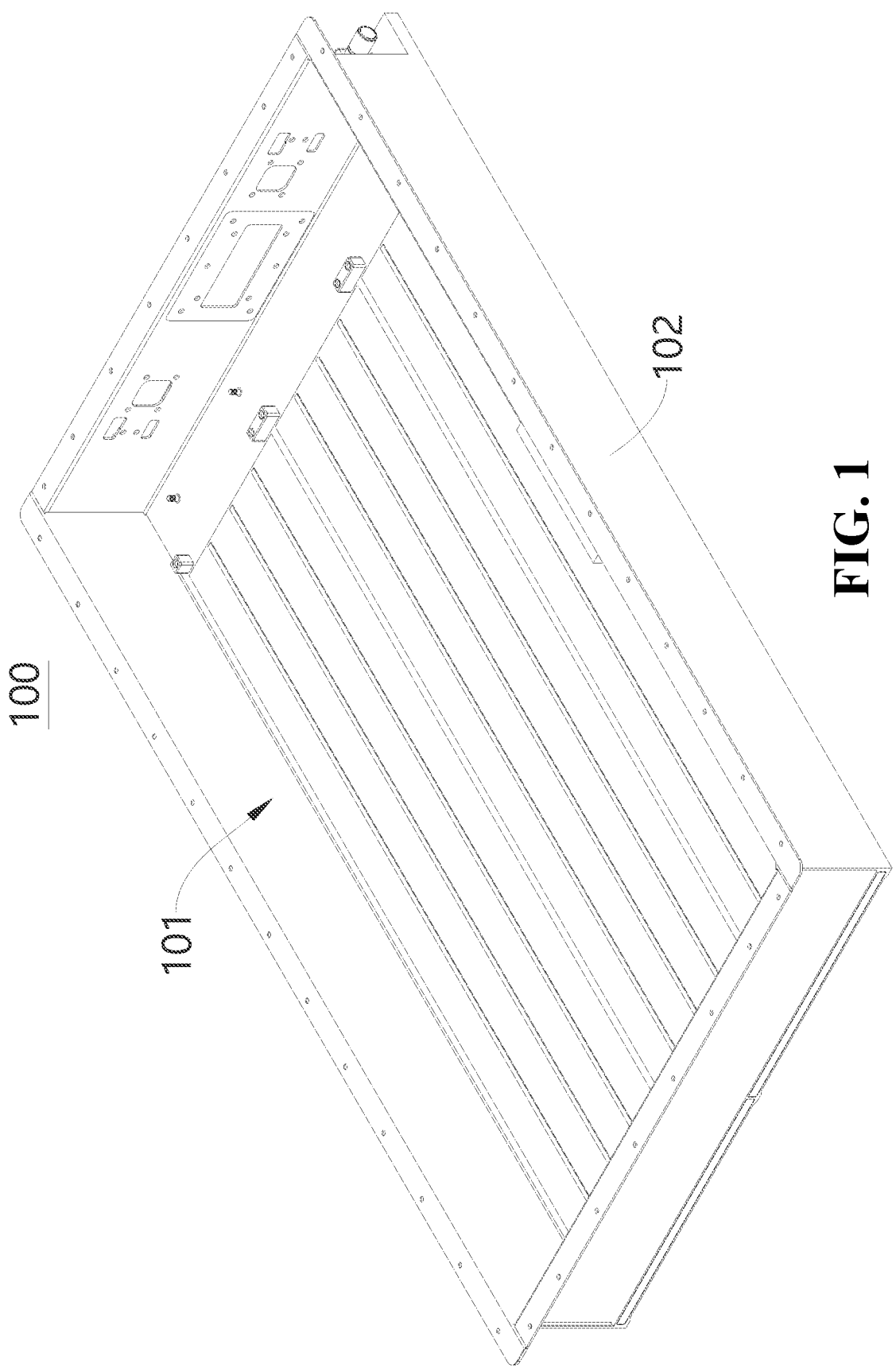
FIG. 1 is a schematic structural view of a box body in implementations of the disclosure.

FIG. 1 is a schematic structural view of a box body 100. As illustrated in FIG. 1, the box body 100 is in a substantially flat rectangular structure. The box body 100 has a bottom wall, an enclosure wall (which includes a front wall plate, a rear wall plate, a left wall plate, and a right wall plate), and a top wall (not illustrated in the figures). The box body 100 is enclosed by the bottom wall plate, the front wall plate, the rear wall plate, the left wall plate, the right wall plate, and the top wall. The box body 100 defines an internal cavity 101 therein for accommodating battery cells. For fixing the battery cells, an inner wall of the box body 100 can be provided with various appropriate fixing structures such as grooves, slots, holes, and protrusions. In addition, in order to facilitate wiring and cable arrangement, structures such as holes can also be provided in the box body according to design requirements.

The fixing structure 300 of the disclosure is used for a battery pack, where the battery pack includes the box body 100 described above. The fixing structure 300 is disposed on an outer surface 102 of the box body 100 (which may be the bottom wall, the enclosure wall, or the top wall). The fixing structure 300 in the disclosure is disposed on an outer surface of the enclosure wall of the box body 100 (that is, a part of the outer surface 102 corresponding to the enclosure wall). It is noted that although the fixing structure 300 of the disclosure is described and illustrated based on the box body 100 of the battery pack, this is not intended to limit the fixing structure 300 to the box body 100 of the battery pack. Based on the fixing structure 300 and its applications illustrated in examples of the disclosure, it is understood that it can also be applied in other fields rather than being limited to the battery field. The fixing structure 300 can still have corresponding applications in other fields where there is a need for fixing, transferring, and moving. And for different application scenarios, it can be modified appropriately, for example, size specifications, production materials, production methods and so on. For example, the fixing structure 300 can be used for computer motherboard installation, graphics card installation, hard disk installation, etc.

Figure 2:
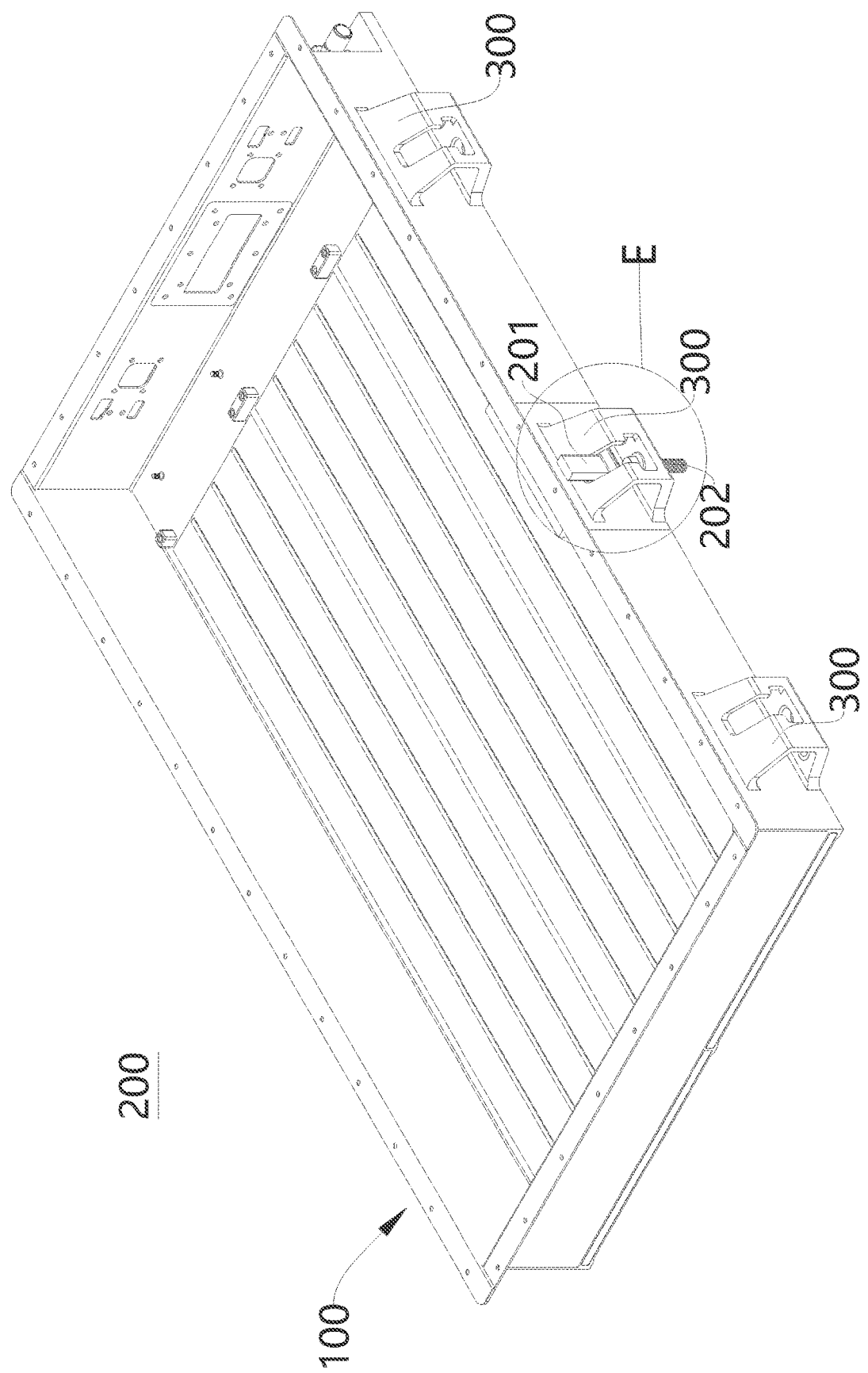
FIG. 2 is a schematic structural view illustrating a combination of a fixing structure and the box body illustrated in FIG. 1 in implementations of the disclosure.

FIG. 2 illustrates a schematic structural view of the battery box 200 formed based on the box body 100 illustrated in FIG. 1 in conjunction with the fixing structure 300 in the implementations of the disclosure. FIG. 2 illustrates three fixing structures 300 disposed on the outer surface 102 of the box body 100. The three fixing structures 300 are arranged at intervals along the outer surface 102 of the box body 100 so as to generally arrange throughout the outer surface 102. With aid of the three fixing structures 300, it is also beneficial to exerting more uniform forces on the box body 100, avoiding a hidden danger of damage due to excessively large local forces.

Figure 3:
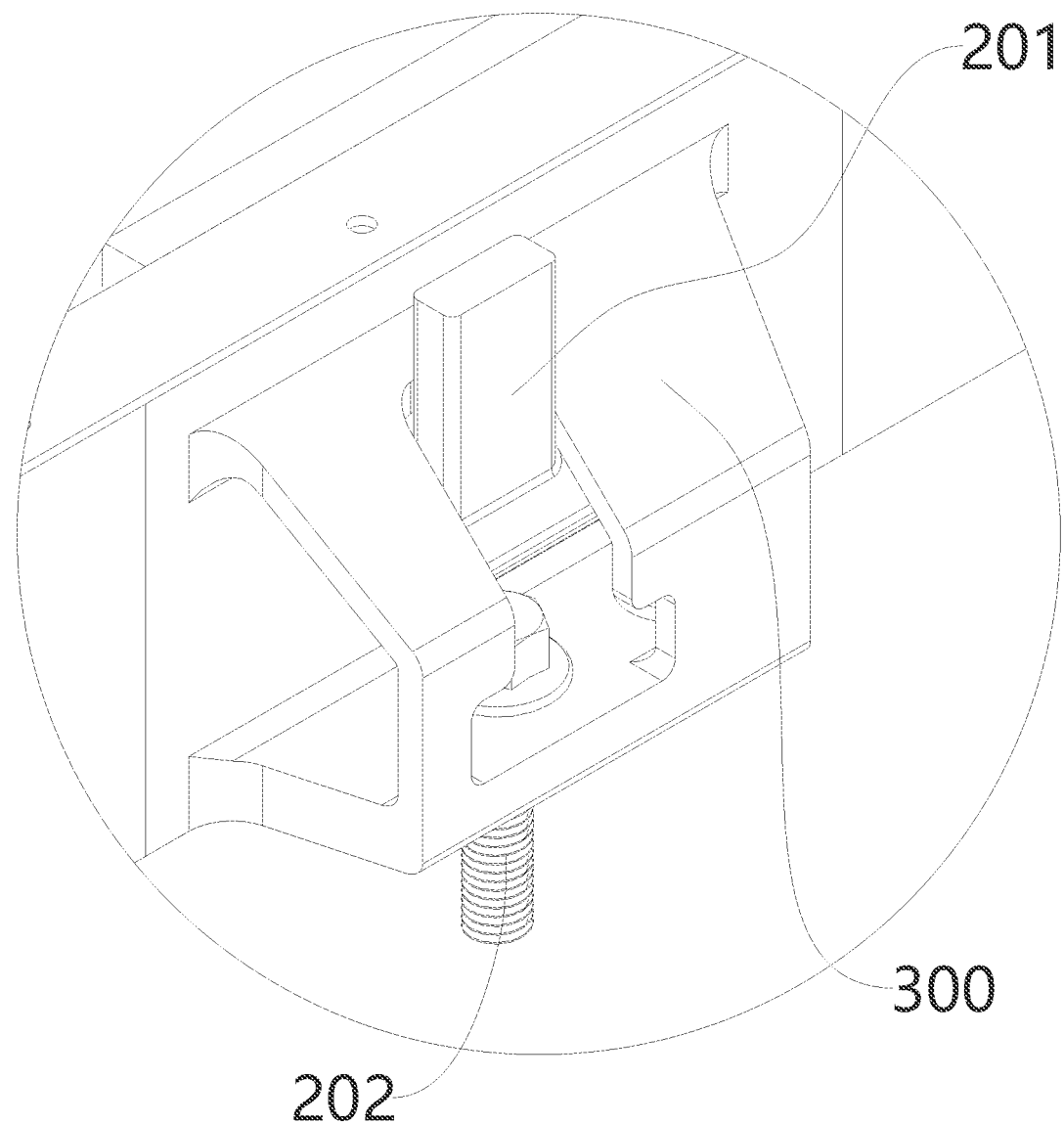
FIG. 3 is a partial enlarged schematic structural view at circle E in FIG. 2.

In addition, as illustrated in FIGS. 2 and 3, in the fixing structure 300 located between the two fixing structures 300 at two ends, two structural members are correspondingly arranged above and below, for example, a hanger 201 located above and a bolted connector 202 located below. Depending on different situations, the fixing structure can be correspondingly provided with different structural members, so as to connect the fixing structure with other components and limit a relative position. For example, in addition to the above-mentioned hanger 201 and bolted connector 202, pins, bearing seats, etc. can also be provided.

The fixing structure 300 of the disclosure is described in detail hereinafter in conjunction with the accompanying drawings (FIG. 4, FIG. 5, and FIG. 6).

FIGS. 4-6 illustrate the fixing structure 300 at different views, respectively. The overall fixing structure 300 is in a substantially U-shape structure, or a substantially C-shape structure. Thus, in terms of structural shape, the fixing structure 300 generally defines an opening and is combined/connected to the box body 100 at a side of the fixing structure 300 where the opening is defined.

The fixing structure 300 of the disclosure is a one-piece structure, and thus there are no parts that are not substantially connected to each other. For example, as illustrated in FIG. 2, the three fixing structures 300 are arranged at intervals at the box body 100, that is, the three fixing structures 300 are not connected to each other. For a clearer illustration of a non-unitary structure with substantially unconnected parts, reference may be made to FIG. 7, which illustrates a fitting relationship between a split-type fixing device and the outer surface 102 of the box body 100 (only part of the box body 100 is illustrated). The split-type fixing device includes a first part 601 and a second part 602 which are independent of and in non-connection with each other. Thus, the split-type fixing device can also be regarded as a split retainer including parts that are independent of each other.

Figure 7:
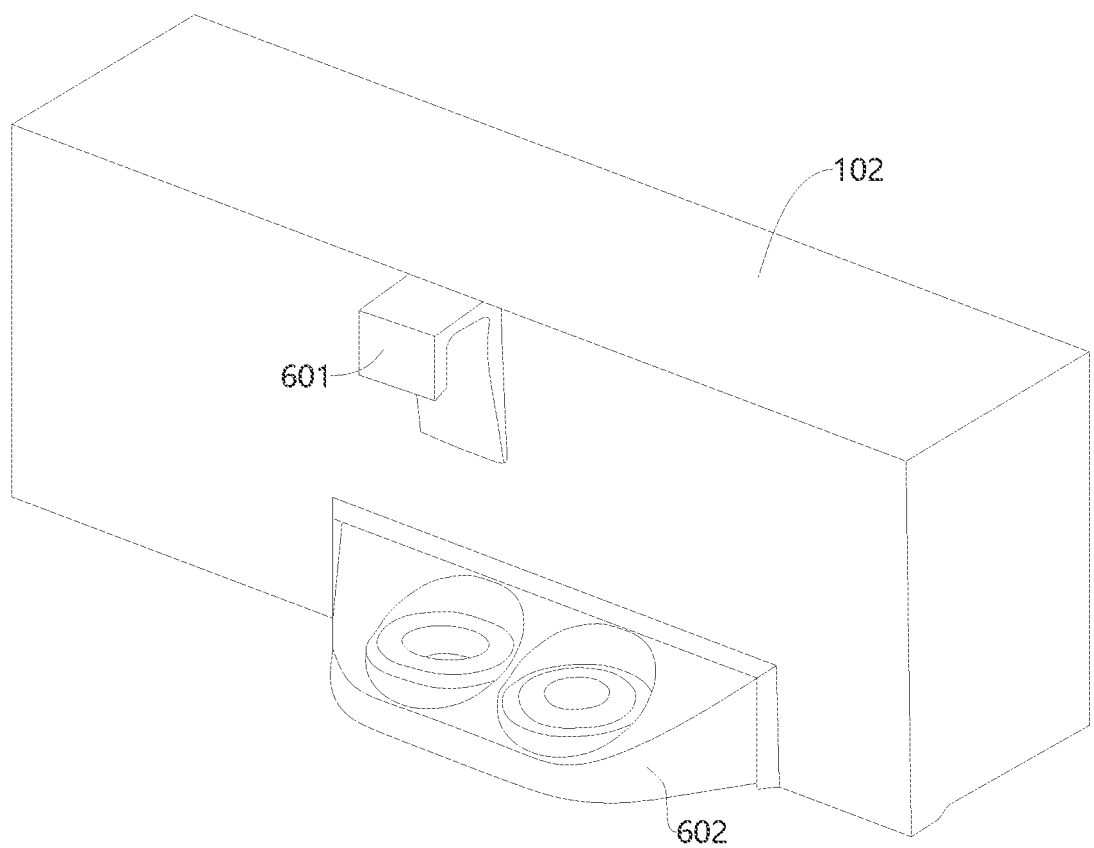
FIG. 7 is a schematic structural view illustrating a combination of a retainer and a box body.

Different from the split-type fixing device illustrated in FIG. 7, the fixing structure 300 of the disclosure as illustrated in FIGS. 4 to 6 is a one-piece structure and thus has a relatively high structural strength and can withstand a relatively great force. In addition, since the fixing structure 300 of the disclosure forms at least two interconnected connection positions with the box body 100, a connection between the fixing structure 300 of the disclosure and the box body 100 is stronger than two mutually independent connections of two parts in FIG. 7.

Referring to FIG. 4, the fixing structure 300 as a whole mainly includes three parts, which are a first connecting body 301, a transition body 303, and a second connecting body 302 connected in sequence. It is understood that, the first connecting body 301 has one end connected with the box body 100. The first connecting body 301 and the second connecting body 302 are arranged approximately opposite to each other. The second connecting body 302 has one end connected with the box body 100. The second connecting body 302 is spaced apart from the first connecting body 301. The transition body 303 has two ends connected with one end of the first connecting body 301 away from the box body 100 and one end of the second connecting body 302 away from the box body 100 respectively. The fixing structure 300 is connected to different parts of the box body 100 via the first connecting body 301 and the second connecting body 302 respectively. In other words, the first connecting body 301 is combined with a first position of the box body 100, the second connecting body 302 is combined with a second position of the box body 100, and the first position is adjacent to the second position. In example drawings, the fixing structure 300 is a bent plate and has a relatively large length and a relatively small thickness. Thus, for example, the fixing structure 300 can be regarded as being formed from a flat plate subjected to appropriate bending. In practical production, the fixing structure 300 can be integrally formed with the box body 100 through injection molding, extrusion, etc.

The fixing structure 300 also has multiple connecting holes 3031 defined in the second connecting body 302, for example, at least two connecting holes 3031, to facilitate mounting of the battery pack. Further, at least one of the multiple connecting holes 3031 is a threaded hole; and/or at least one of the multiple connecting holes 3031 is an unthreaded hole. For example, the connecting holes 3031 defined in the second connecting body 302 include at least two holes for different usages. For example, in all the connecting holes 3031, one of the connecting holes 3031 is provided with threads 3032, such that the connecting hole 3031 with the threads 3032 can be connected to other structures via bolts, studs, etc., and one of the connecting holes 3031 is an unthreaded hole. Thus, when the box body 100 is connected to other structures, a threaded hole and an unthreaded hole can be defined correspondingly in other structures as mentioned above. Thus, when the box body 100 is connected to the other structures, a bolt can be used for connection from a front side or a rear side. In an example, connecting from the front side refers to that the bolt extends through the unthreaded hole of the second connecting body 302 to be in a threaded connection with the thread hole of the other structure. Correspondingly, for example, connecting from the rear side refers to that the bolt extends through the unthreaded hole of the other structure to be in a threaded connection with the threaded hole of the second connecting body 302.

The connecting hole 3031 with the threads 3032 defined in the second connecting body 302 can be achieved by threading an inner wall of the connecting hole 3031, or by mounting or fixing a nut in the connecting hole 3031. The nut may be buried in the connecting hole 3031, or part of the nut is buried in the connecting hole 3031 and the rest of the nut extends beyond the connecting hole 3031.

Accordingly, for ease of operation, the transition body 303 defines a through hole 3033 extending from an inner surface to an outer surface, that is, the through hole 3033 extends through the transition body 303 in a thickness direction of the transition body 303. As illustrated in FIGS.

2 and 3, the through hole 3033 can be used not only to fit with the hanger 201, but also to serve as a passage through which the bolted connector 202 can fit with the connecting hole 3031 of the second connecting body 302, which facilitates fitting with the fixing structure 300 through other structural members, such that the battery box provided with the fixing structure 300 can be more firmly confined, and a weight of the fixing structure 300 can be reduced to a certain extent.

Further, part of the through hole 3033 faces the second connecting body 302 in a direction from the first connecting body 301 to the second connecting body 302, such that it is convenient for the bolted connector 202 to pass through the through hole 3033 to fit with the connecting hole 3031. Furthermore, the connecting holes 3031 include an unthreaded hole, and the through hole 3033 faces the unthreaded hole. The bolted connector 202 that fits with the unthreaded hole needs to pass through the unthreaded hole to fit with the threading hole or nut in other structures, and thus a relatively large space is needed for the bolted connector 202 to be inserted into the unthreaded hole. The through hole 3033 faces the unthreaded hole and can provide a space for mounting the bolted connector 202.

In some implementations of the disclosure, as illustrated in FIGS. 4-6, the through hole 3033 has a first hole segment 501 and a second hole segment 502 connected in sequence, the first hole segment 501 is located at one side of the second hole segment 502 close to the first connecting body 301, and the second hole segment 502 is wider than the first hole segment 501. Therefore, the through hole 3033 is in a substantially T-shape. The hanger 201 (which is also a T-shaped structure) can be inserted into the through hole 3033 from the second hole segment 502, and then be limited and clamped by the first hole segment 501.

In an implementation, the transition body 303 has a first connecting part 401, a bending part 402, and a second connecting part 403 connected in sequence. One end of the first connecting part 401 away from the bending part 402 is connected with one end of the first connecting body 301 away from the box body 100. One end of the second connecting part 403 away from the bending part 402 is connected with one end of the second connecting body 302 away from the box body 100. The first connecting part 401 and the second connecting part 403 defines an angle therebetween. The first connecting part 401 faces the second connecting body 403. The through hole 3033 can be defined in the first connecting part 401 of the transition body 303, or in the second connecting part 403 of the transition body 303, which can be determined according to requirements of different connection ways.

In some examples, the through hole 3033 extends from the first connecting part 401 to the second connecting part 403 through the bending part 402. Therefore, the through hole 3033 is defined throughout most of the entire transition body 303, which can provide a relatively large space for movement, thereby facilitating the fitting with other structural members as mentioned above, allowing arrangements of both the hanger 201 and the bolted connector 202 on the fixing structure 300, and reducing the weight of the fixing structure 300 to a certain extent. Further, a configuration of the through hole 3033 can also be adjusted. For example, in an example, the through hole 3033 has the first hole segment 501 located at the first connecting part 401 and the transition part 402 and the second hole segment 502 located at the second connecting part 403. The first hole segment 501 is narrower than the second hole segment 502, such that the first hole segment 501 can form a snap-fit structure with other structural components, thereby improving the convenience of use.

In addition, because the second connecting body 302 of the fixing structure 300 defines the connecting hole 3031, when setting the above-mentioned through hole 3033, a position of the through hole 3033 can be correspondingly adjusted in consideration of usage of the connecting hole 3031. For example, referring to FIG. 2, there are two connecting holes 3031, one of the two connecting holes 3031 is an unthreaded hole (i.e., a first hole), and the other of the two connecting holes 3031 is a hole with the threads 3032 (i.e., a second hole). The first hole may face the aforementioned through hole 3033, so that the bolted connector 202 can pass through the through hole 3033 to be inserted into the first hole. At the same time, since the second hole is for inserting a bolt extended from other structures (such as a vehicle frame on which the battery box 200 is mounted) to form a thread connection, the fixing structure 300 may not need to define the aforementioned through hole 3033 at a position corresponding to the second hole, or the through hole 3033 may not face the second hole.

The transition body 303 of the fixing structure 300 may be straight or bent. In the implementations of the disclosure, the transition body 303 is bent. When the transition body 303 of the fixing structure 300 is straight, it may be necessary to further enlarge structural dimensions (for example, a length relative to the outer surface 102 the box body 100) of the first connecting body 301 and the second connecting body 302 in order to reserve space for operation. Compared to the straight shape, the bent shape of the transition body 303 can improve structural strength and impact resistance of the fixing structure 300.

The bent transition body 303 can be formed in such a way that its specific final structure and shape can be relatively reasonably adjusted according to connections and positions of the first connecting body 301 and the second connecting body 302, which is beneficial to releasing internal stresses and improving its fatigue resistance. For example, the transition body 303 includes the first connecting part 401, the bending part 402, and the second connecting part 403 connected in sequence. In an implementation, the first connecting part 401 is connected with the first connecting body 301, the second connecting part 403 is connected with the second connecting body 302, and the first connecting part 401 and the second connecting part 403 are angled to each other.

Accordingly, it is also possible to selectively control bending of the transition body 303 by controlling a shape of the bending portion 402 and changing positions of two ends relative to the bending portion 402.

Accordingly, when forming the fixing structure 300, an arrangement of the first connecting part 401 and the second connecting part 403 of the transition body 303 may be appropriately considered and adjusted. In some examples, the transition body 303 is bent in an arcuate manner, that is, the bending part 402 is arcuate, and accordingly, an arcuate region of the transition body 303 is located at the bending part 402 of the transition body 303. As such, surface transition smoothness can be improved, transition smoothness between the first connecting part and the second connecting part can be improved, local stresses can be avoided to a certain extent, and the lifespan of the bending part can be prolonged.

A bending manner of the transition body 303 can be illustrated to arrangements of the first connecting part 401 and second connecting part 403 of the transition body 303. For example, the second connecting body 302 and the second connecting part 403 are arranged in a staggered way, that is, the second connecting body 302 is perpendicular to the second connecting part 403. As such, installation convenience of the fixing structure 300 can be provided. As illustrated in FIG. 2, the second connecting body 302 extends in a substantially horizontal direction and the second connecting part 403 extends in a substantially vertical direction, that is, the second connecting body 302 and the second connecting part 403 are arranged at a substantially right angle A. At the same time, the first connecting body 301 can be inclined upward, while the first connecting part 401 is inclined downward, and the first connecting body 301 and the first connecting part 401 are arranged at a substantially acute angle B. Angle C between the first connecting part 401 and the second connecting part 403 is obtuse. As illustrated in FIG. 4, in combination with the curved bending part 402, the surface smoothness can be further improved.

By controlling distribution between the first connecting part 401, the bending part 402, and the second connecting part 403 of the transition body 303, a surface transition of the transition body 303 can be made smoother and more natural, which can reduce excessive internal stress concentration, thus improving a damage resistance of the transition body 303. In addition, by controlling a structure of the transition body 303 as described above, a usage mode of the transition body 303 can be changed. For example, the first connecting body 301 and the first connecting part 401 are arranged in an inclined shape, so that they can be used for hanging other structures. The second connecting body 302 and the second connecting part 403 are arranged in a staggered way, thus they can be fixed via fasteners such as bolts.

The above are only preferred implementations of the disclosure, and are not used to limit the disclosure. For those skilled in the art, the disclosure may have various changes and modifications. Any modification, equivalent replacement, improvement, etc. made within the spirit and principles of this disclosure shall be included in the scope of protection of the disclosure.

What is claimed is:

1. A fixing structure for a battery pack, the battery pack comprising a box body, the fixing structure being disposed on an outer surface of the box body and comprising:
    a first connecting body connected with the box body;
    a second connecting body connected with the box body, and the second connecting body being spaced apart from the first connecting body; and
    a transition body, the transition body has two ends connected with one end of the first connecting body away from the box body and one end of the second connecting body away from the box body respectively;
    wherein the second connecting body defines a plurality of connecting holes;
    the transition body defines a through hole;
    part of the through hole faces the second connecting body in a direction from the first connecting body to the second connecting body; and
    the through hole has a first hole segment and a second hole segment connected in sequence, the first hole segment is located at one side of the second hole segment close to the first connecting body, and a width of the second hole segment is greater than a width of the first hole segment;
    the transition body has a first connecting part, a bending part, and a second connecting part connected in sequence;
    one end of the first connecting part away from the bending part is connected with the one end of the first connecting body away from the box body;
    one end of the second connecting part away from the bending part is connected with the one end of the second connecting body away from the box body;
    the first connecting part and the second connecting part define an angle therebetween;
    the first connecting part faces the second connecting body;
    the through hole extends from the first connecting part to the second connecting part through the bending part; and
    the angle between the first connecting part and the second connecting part is an obtuse angle.

2. The fixing structure of claim 1, wherein the fixing structure is integrally formed.

3. The fixing structure of claim 1, wherein
    at least one of the plurality of connecting holes is a threaded hole.

4. The fixing structure of claim 1, wherein the plurality of connecting holes comprise an unthreaded hole, and the through hole faces the unthreaded hole.

5. The fixing structure of claim 1, wherein the bending part is in an arc shape.

6. The fixing structure of claim 1, wherein the second connecting body is perpendicular to the second connecting part.

7. A battery box, comprising:
    a box body having an internal cavity; and
    a fixing structure fixed on the outer surface of the box body, the battery pack comprising a box body, the fixing structure being for a battery pack and disposed on an outer surface of the box body and comprising:
        a first connecting body connected with the box body;
        a second connecting body connected with the box body, and the second connecting body being spaced apart from the first connecting body; and
        a transition body, the transition body has two ends connected with one end of the first connecting body away from the box body and one end of the second connecting body away from the box body respectively;
    wherein the second connecting body defines a plurality of connecting holes;
    the transition body defines a through hole;
    part of the through hole faces the second connecting body in a direction from the first connecting body to the second connecting body; and
    the through hole has a first hole segment and a second hole segment connected in sequence, the first hole segment is located at one side of the second hole segment close to the first connecting body, and a width of the second hole segment is greater than a width of the first hole segment;
    the transition body has a first connecting part, a bending part, and a second connecting part connected in sequence;
    one end of the first connecting part away from the bending part is connected with the one end of the first connecting body away from the box body;
    one end of the second connecting part away from the bending part is connected with the one end of the second connecting body away from the box body;
    the first connecting part and the second connecting part define an angle therebetween;

the first connecting part faces the second connecting body;

the through hole extends from the first connecting part to the second connecting part through the bending part; and the angle between the first connecting part and the second connecting part is an obtuse angle.

8. The battery box of claim 7, wherein the box body and the fixing structure are integrally formed.

9. The battery box of claim 7, wherein the fixing structure is integrally formed.

10. The battery box of claim 7, wherein at least one of the plurality of connecting holes is a threaded hole.

11. The battery box of claim 7, wherein the plurality of connecting holes comprise an unthreaded hole, and the through hole faces the unthreaded hole.

12. The battery box of claim 7, wherein the transition body has a first connecting part, a bending part, and a second connecting part connected in sequence;

one end of the first connecting part away from the bending part is connected with the one end of the first connecting body away from the box body;

one end of the second connecting part away from the bending part is connected with the one end of the second connecting body away from the box body;

the first connecting part and the second connecting part define an angle therebetween;

the first connecting part faces the second connecting body; and the through hole extends from the first connecting part to the second connecting part.

13. The battery box of claim 12, wherein the bending part is in an arc shape.

14. The battery box of claim 12, wherein the second connecting body is perpendicular to the second connecting part.

15. A battery pack, comprising a battery box, wherein the battery box comprises:

a box body having an internal cavity; and a fixing structure fixed on the outer surface of the box body, the battery pack comprising a box body, the fixing structure being for a battery pack and disposed on an outer surface of the box body and comprising:

a first connecting body connected with the box body;

a second connecting body connected with the box body, and the second connecting body being spaced apart from the first connecting body; and a transition body, the transition body has two ends connected with one end of the first connecting body away from the box body and one end of the second connecting body away from the box body respectively;

wherein the second connecting body defines a plurality of connecting holes;

the transition body defines a through hole;

part of the through hole faces the second connecting body in a direction from the first connecting body to the second connecting body; and the through hole has a first hole segment and a second hole segment connected in sequence, the first hole segment is located at one side of the second hole segment close to the first connecting body, and a width of the second hole segment is greater than a width of the first hole segment;

the transition body has a first connecting part, a bending part, and a second connecting part connected in sequence;

one end of the first connecting part away from the bending part is connected with the one end of the first connecting body away from the box body;

one end of the second connecting part away from the bending part is connected with the one end of the second connecting body away from the box body;

the first connecting part and the second connecting part define an angle therebetween;

the first connecting part faces the second connecting body;

the through hole extends from the first connecting part to the second connecting part through the bending part; and the angle between the first connecting part and the second connecting part is an obtuse angle.

16. The battery pack of claim 15, wherein the box body and the fixing structure are integrally formed.

17. The battery pack of claim 15, wherein at least one of the plurality of connecting holes is a threaded hole.

\* \* \* \* \*